(No Model.)
J. C. PLUNKETT & G. DONAT.
VALVE APPLICABLE TO VESSELS CONTAINING COMPRESSED GAS.
No. 589,479. Patented Sept. 7, 1897.
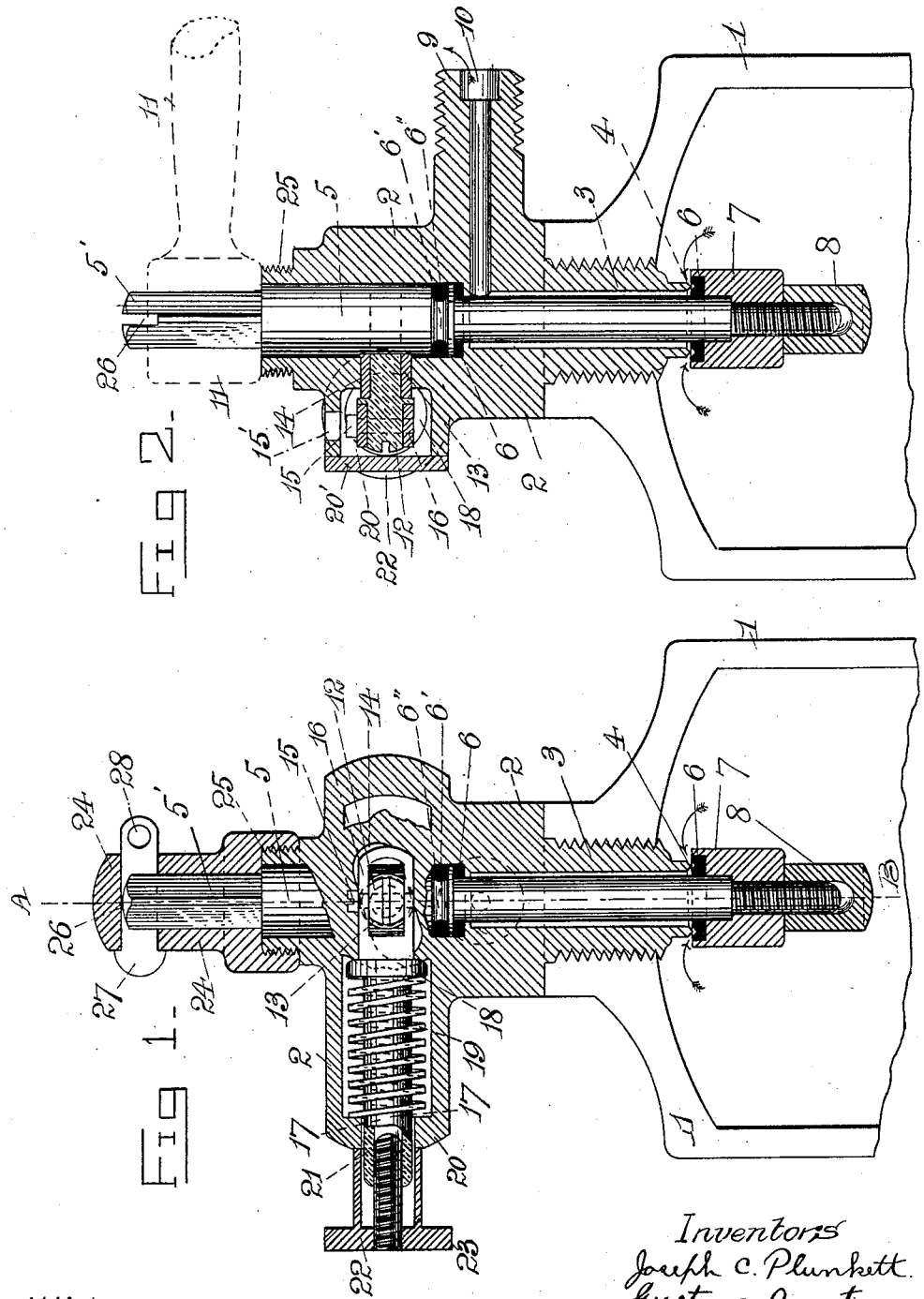
Witnesses
Guy A. Ourand.
Alma Babcock.
Inventors
Joseph C. Plunkett.
Gustav Donat
per Wm H Babcock
Attorney.

UNITED STATES PATENT OFFICE.

JOSEPH CHARLES PLUNKETT AND GUSTAVO DONAT, OF LONDON, ENGLAND.

VALVE APPLICABLE TO VESSELS CONTAINING COMPRESSED GAS.

SPECIFICATION forming part of Letters Patent No. 589,479, dated September 7, 1897.

Application filed May 24, 1897. Serial No. 637,903. (No model.)

*To all whom it may concern:*

Be it known that we, JOSEPH CHARLES PLUNKETT, surgeon dentist, residing at 173 Stroud Green Road, London, N., and GUSTAVO DONAT, warehouseman, residing at 3, 4, and 5 Australian Avenue, London, E. C., England, subjects of the Queen of Great Britain, have invented a certain new and useful Improved Valve Applicable to Vessels Containing Compressed Gas, Gases, or Gaseous Liquids, of which the following is a specification.

Our invention consists in an improved construction of valve applicable to vessels containing compressed gas, gases, or gaseous liquids, the object we have more particularly in view being by means of the combination of interacting parts, hereinafter described, to insure the hermetic sealing of cylinders and other vessels containing compressed gases or gaseous liquids under all variations of internal pressure, to provide a ready means for liberating said gases or gaseous liquids in any required volume or quantity with ease and safety, and to prevent tampering with the contents during transit.

The construction, application, and operation of our invention will be readily understood by reference to the accompanying drawings, in which—

Figure 1 is a plan part, being in section. Fig. 2 is a part section on line A B, Fig. 1.

In the drawings, 1 is the steel cylinder or other vessel containing compressed gas or gaseous liquid. The body or frame 2, which contains the spring, guide-rod, valve-spindle, and other coöperating parts, may be made of gun-metal, brass, iron, or other suitable material, and is secured thereto by the screwed nose-piece 3, the extremity of which consists of a tapering ring which forms the valve-seat 4. Through the body a hole is bored, and to this is carefully fitted the metallic spindle 5, a packing ring or washer of vulcanized fiber 6 or equivalent suitable material being inserted at the point shown. A grooved channel 6' is also formed on the spindle 5 and a soft-rubber washer 6" is shrunk thereon. This has the effect of preventing any escape of gas past the spindle.

The lower part of spindle 5 is screwed and fitted with the valve 7, which is packed at its upper end, as shown, with a ring of vulcanized fiber 6 and secured to the spindle by a nut 8. The spindle 5 is turned down beneath the packing slightly smaller than the borehole, so as to allow the gas or gaseous liquid to pass around it when the valve is opened by means of the hole 10 to the screwed union outlet 9. The opposite projecting end of the spindle may be shaped to a square section 5' and fitted with a plain and removable lever 11, of any convenient kind, (see dotted lines, Fig. 2,) or a small hand-wheel or other device may be mounted thereon or keyed thereto. A stout steel or other tough metal pin or stud 12 is screwed, driven, riveted, or otherwise securely fastened into or through the swell upon spindle 5, a roller 13, of steel or other hard metal, being so journaled thereon as to engage with and travel along an inclined or helical slot 14, milled out or otherwise formed in the body.

The upper end of the pin or stud 12 is hinged or pivoted, by means of a screwed pin 15, passed through the hole 15', to the slotted head 16 of the guide bar or rod 17, which is formed with a shoulder 18. A spiral spring 19 surrounds the guide bar or rod and abuts against the shoulder 18 thereon and the end wall 20 of the body 2, which is suitably cored out to receive it, and fitted with a cover 20', screwed on. The guide rod or bar 17 passes through the end wall of body 2 and its end 21 is bored and tapped, so that when charging the valve may be kept open by screwing in the shouldered plug 22, having a milled head 23. (Shown in Fig. 1.) Another feature of our invention consists in affixing a metallic cap 24 over the projecting square or other shaped end of the spindle. This we attach preferably by screwing, as shown at 25, a hole 26 being cored or slotted through the cap and end of the spindle 5. In this is placed a pin-cotter or equivalent device 27, the end of which is drilled, as at 28, or otherwise fashioned, so as to enable a padlock to be attached. In this manner we prevent all tampering with the valve while traveling or the loss of contents or damage from rough handling.

The operation of our invention is as follows: A handle suitable for the purpose required being fitted to the squared or other shaped end of spindle 5 and pressure exerted upon it in such direction as to open the valve, the roller 13 will be compelled to travel in the inclined milled groove 14, the valve 7 being thereby forced from its seat. It will be understood that the inclined or helical slot may be made right or left handed, so as to enable the regulating-handle operating the valve to be turned in either direction. The escaping gas or gaseous liquid passes in the direction of the arrows through the bored hole 10 to the outlet 9, and thence to the rubber bag, bottle, or other receptacle for use. Since the act of opening the valve by the partial rotation of spindle also tends to compress the powerful spring 19, it is promptly and securely closed on pressure being removed quite independently of the pressure of the gas or gaseous liquid contained in the vessel, which is constantly diminishing as the contents are drawn off. The valves generally employed for this purpose are what are known as "conical screw-down" valves. Their efficiency being dependent upon the forcing together of two hard metallic conical surfaces it follows that a considerable effort is required to effectually keep such valves air-tight. On the other hand, they sometimes become fixed, are always difficult to open, and cannot be successfully used for giving a steady supply of gas or gaseous liquid without the intervention of some form of regulating device. Our invention overcomes these defects and renders the control of heavy pressures safe, effective, and simple.

Part of the difficulty in keeping compressed gas or gaseous liquid regulating valves tight arises from the formation or condensation of ice particles upon or between the valve-faces. The partial rotation of the spindle and valve described peculiar to our invention suffices to crush or liquefy such particles, and thereby overcomes this obstacle. In some cases we may employ leather, pewter, lead, or like soft metal as a valve-facing. To charge a cylinder or vessel fitted with our improvements, the valve is opened to its full extent and the plug 22 screwed into the protruding end of the tapped guide-rod 17, as shown in Fig. 1.

We do not confine the construction of our improvements to the exact shape shown, as it will be readily understood that it may be altered in detail to suit the varying forms of gas or other bottles, cylinders, and condensers without, however, departing from its distinctive features.

Having fully described our invention, what we desire to claim and secure by Letters Patent is—

1. In a valve for hermetically sealing and regulating the supply from vessels containing compressed gas, mixed gases, and gaseous liquids, the combination of a partially-rotating spindle 5, upon which is secured a plain or faced valve 7 closing against a V-shaped metallic seating 4, the stud 12, secured to and turning with said spindle and carrying a metallic roller 13, which engages with the inclined slot 14, formed in casing, the shouldered guide 17, flexibly secured to stud 12, and surrounded by spring 19, the respective parts coöperating and interacting for the purposes set forth.

2. In a valve for operating vessels containing compressed gas, gases, and liquids, the combination with the operating-spindle 5, shaped for the attachment of a lever as at 5' and the valve on the said spindle with the metallic cap 24, screwed to the body 2, and secured by the pin or cotter 27, the vulcanized fiber packing-ring 6, and the grooved channel 6' in which is the soft-rubber washer 6" substantially as and for the purposes set forth.

3. The combination in a valve for operating vessels containing compressed gas, gases, and gaseous liquids, of the shouldered guide 17, having a tapped end 21 and fitted with a shouldered screwed plug 22, coöperating therewith for maintaining the valve in the open position when charging the spindle 5, the valve carried thereby and connections to said guide, substantially as set forth.

In witness whereof we have hereunto set our hands in the presence of two witnesses.

JOSEPH CHARLES PLUNKETT.
GUSTAVO DONAT.

Witnesses:
FRANCIS HEARON ROGERS,
A. STEAD.